United States Patent
Chen

[11] Patent Number: 5,996,955
[45] Date of Patent: Dec. 7, 1999

[54] ENGAGING MEMBER FOR ASSEMBLED SHELVES

[76] Inventor: Ding-Kuo Chen, P.O. Box 63-247, Taichung, Taiwan

[21] Appl. No.: 09/229,236

[22] Filed: Jan. 12, 1999

[51] Int. Cl.[6] .......................... A47H 1/16; A47G 29/02; F16L 3/22; F16L 3/08

[52] U.S. Cl. ...................... 248/302; 248/249; 248/68.1; 248/65

[58] Field of Search .................. 248/302, 249, 248/68.1, 65; 24/129 R, 131 R

[56] References Cited

U.S. PATENT DOCUMENTS

| | | | |
|---|---|---|---|
| 2,517,937 | 8/1950 | Stanton | 248/533 |
| 2,636,704 | 4/1953 | Norberg | 248/79 |
| 3,504,108 | 3/1970 | Kihs | 175/154 |
| 3,883,934 | 5/1975 | Rochfort | 248/65 |
| 4,672,703 | 6/1987 | Frazier | 5/503.1 |

*Primary Examiner*—Derek J. Berger
*Assistant Examiner*—David Heisey
*Attorney, Agent, or Firm*—Alan Kamrath; Oppenheimer, Wolff & Donnelly, LLP

[57] ABSTRACT

An engaging member is provided for engaging two cross rods consisting of a first rod and a second rod. The engaging member includes an inverted U-shaped section having two ends. Each end of the inverted U-shaped section extends in a direction transverse to a plane on which the inverted U-shaped section locates, thereby forming an upwardly facing receiving section through which the second rod is extended. The receiving sections are parallel to each other and respectively joined with a first inclined section and a second inclined section. The first inclined section has a distal end extending across the second inclined section, thereby forming a first inverted U-shaped retaining section that is located above the first inclined section and the second inclined section. The second inclined section has a distal end extending across the first inclined section and, thereby forming a second inverted U-shaped retaining section that is located above the first inclined section and the second inclined section. The second inverted U-shaped retaining section is spaced apart from the first inverted U-shaped retaining section. The first rod is extended through the inverted U-shaped section and between the first inclined section and the second inclined section, while the first inverted U-shaped retaining section and the second inverted U-shaped retaining section are engaged with a portion of an upper periphery of the first rod. Each of the first inclined section and the second inclined section forms a bend adjacent to an associated receiving section for securely retaining the second rod in the receiving sections. The inverted U-shaped section is inclined toward the retaining sections, while the inverted U-shaped section and the receiving sections are so sized that the first rod rests on the second rod, thereby providing a reliable engaging effect between the first rod and the second rod.

1 Claim, 3 Drawing Sheets

ENGAGING MEMBER FOR ASSEMBLED SHELVES

BACKGROUND OF THE INVENTION

1. Field of the Invention

The present invention relates to an engaging member for assembled shelves that can be formed by a single wire.

2. Description of the Related Art

A tool is generally required for assembling conventional assembled shelves. In some cases, bolts, nuts, or nails are required, and the shelf must include holes or screw holes if the bolts and nuts are applied. Assembly of the shelf is time-consuming and labor-intensive. The construction of the shelf is not changeable and thus has limited application. In addition, the transportation and carriage of the shelf are inconvenient and/or costly. Although the shelf may be integrally formed as a single unit, it cannot be modified to match with personal need and the environment restriction. The present invention is intended to provide an improved engaging member that mitigates and/or obviates the above-mentioned problems.

SUMMARY OF THE INVENTION

It is a primary object of the present invention to provide an engaging device for assembled shelves.

In accordance with the present invention, an engaging member is provided for engaging two cross rods consisting of a first rod and a second rod. The engaging member comprises an inverted U-shaped section having two ends. Each end of the inverted U-shaped section extends in a direction transverse to a plane on which the inverted U-shaped section locates, thereby forming an upwardly facing receiving section through which the second rod is extended. The receiving sections are parallel to each other and respectively joined with a first inclined section and a second inclined section. The first inclined section has a distal end extending across the second inclined section, thereby forming a first inverted U-shaped retaining section that is located above the first inclined section and the second inclined section and has a first retaining end. The second inclined section has a distal end extending across the first inclined section and, thereby forming a second inverted U-shaped retaining section that is located above the first inclined section and the second inclined section and has a second retaining end. The second inverted U-shaped retaining section is spaced apart from the first inverted U-shaped retaining section. The first rod is extended through the inverted U-shaped section and between the first inclined section and the second inclined section, while the first inverted U-shaped retaining section and the second inverted U-shaped retaining section are engaged with a portion of an upper periphery of the first rod. Each of the first inclined section and the second inclined section forms a bend adjacent to an associated receiving section for securely retaining the second rod in the receiving sections. The inverted U-shaped section is inclined toward the retaining sections, while the inverted U-shaped section and the receiving sections are so sized that the first rod rests on the second rod, thereby providing a reliable engaging effect between the first rod and the second rod.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
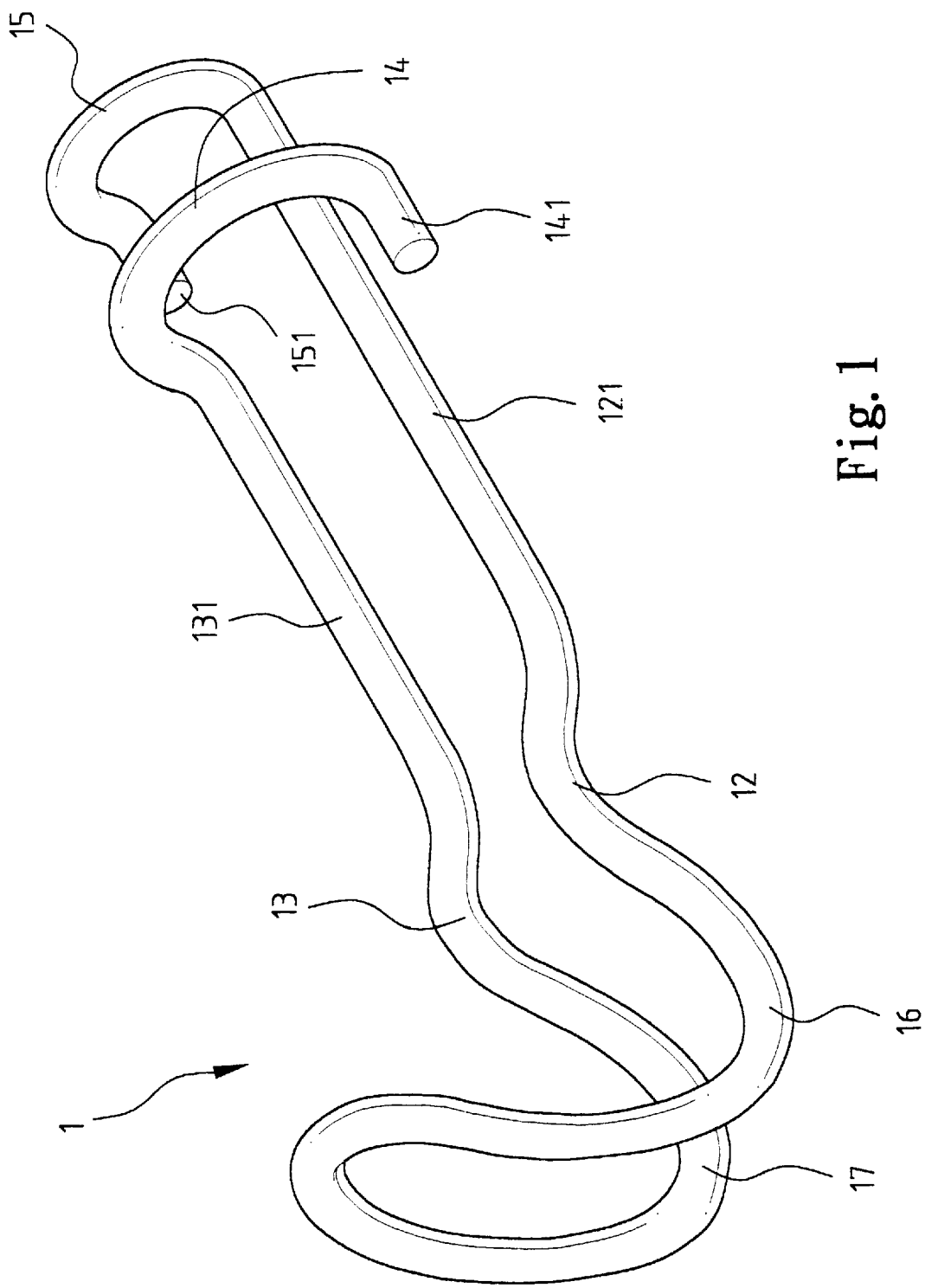
FIG. 1 is a perspective view of an engaging member in accordance with the present invention.

Referring to FIG. 1, an engaging member 1 in accordance with the present invention is provided for engaging with two cross rods 2 and 3. The engaging member 1 generally includes an inverted U-shaped section 11 having two ends. Each end extends in a direction transverse to a plane on which the inverted U-shaped section 11 locates, thereby forming an upwardly facing receiving section 16, 17 through which the rod 3 is extended. The receiving sections 16 and 17 are parallel to each other and respectively joined with a first inclined section 121 and a second inclined section 131. The first inclined section 121 has a distal end extending across the second inclined section 131, thereby forming a first inverted U-shaped retaining section 15 that is located above the first inclined section 121 and the second inclined section 131 and has a retaining end 151. The second inclined section 131 has a distal end extending across the first inclined section and 121, thereby forming a second inverted U-shaped retaining section 14 that is located above the first inclined section 121 and the second inclined section 131 and has a retaining end 141. The second inverted U-shaped retaining section 14 is spaced apart from the first inverted U-shaped retaining section 15. Each of the first inclined section 121 and the second inclined section 131 forming a bend 12, 13 adjacent to an associated receiving section 16, 17 for securely retaining the rod 3 in the receiving sections 16 and 17. The engaging member 1 may be formed by a single wire.

Figure 2:
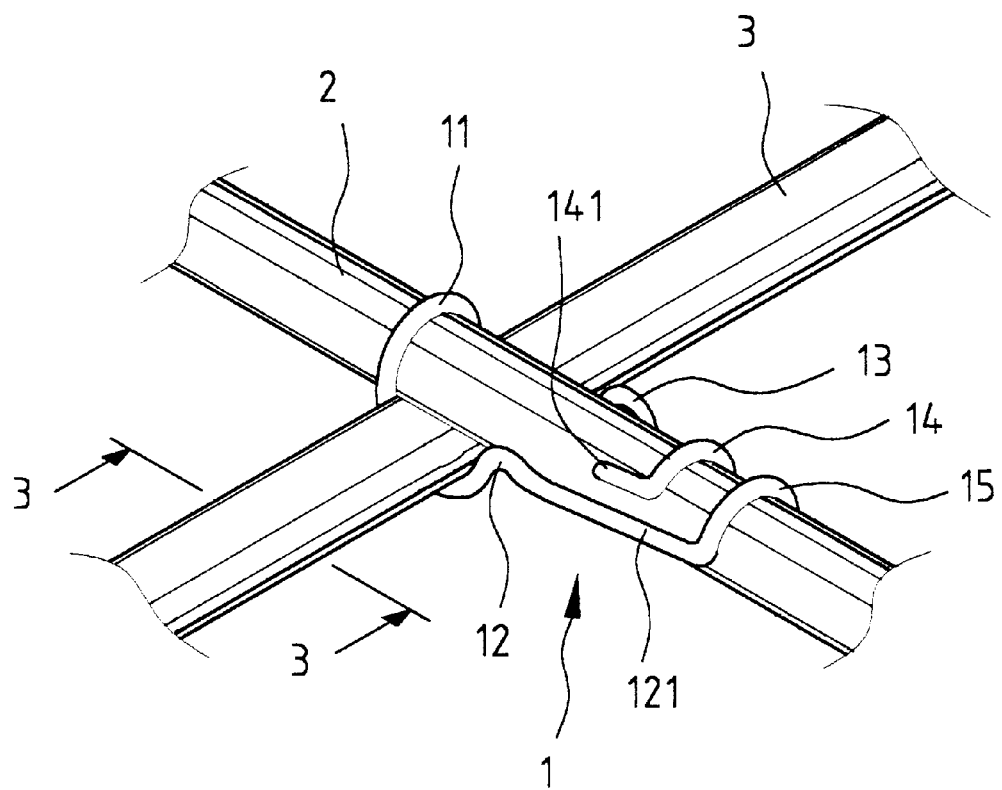
FIG. 2 is a perspective view illustrating two cross rods secured together by the engaging member in accordance with the present invention.
Figure 3:
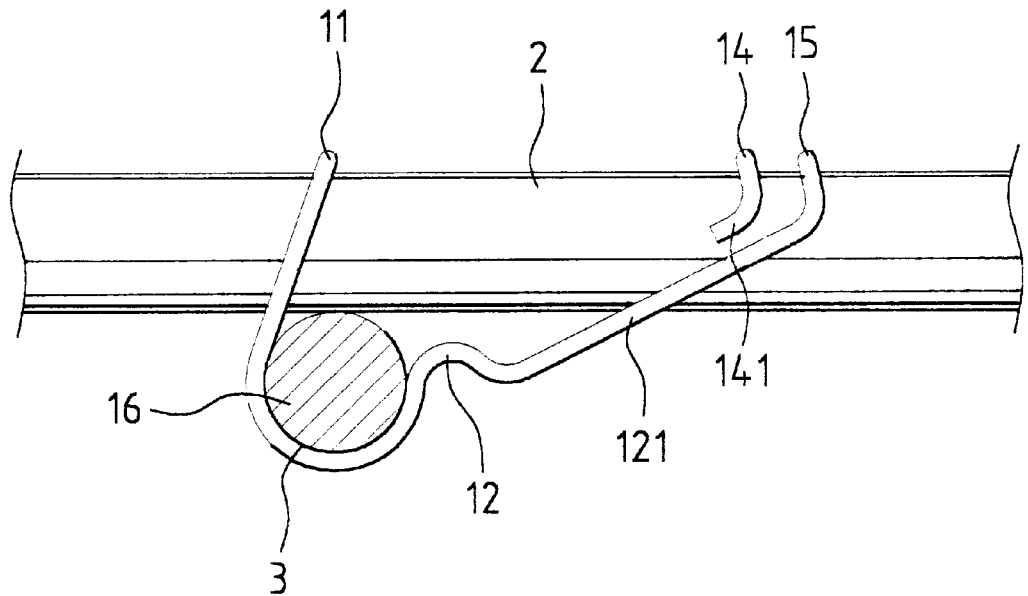
FIG. 3 is a sectional view taken along line 3—3 in FIG. 2.
Figure 4:
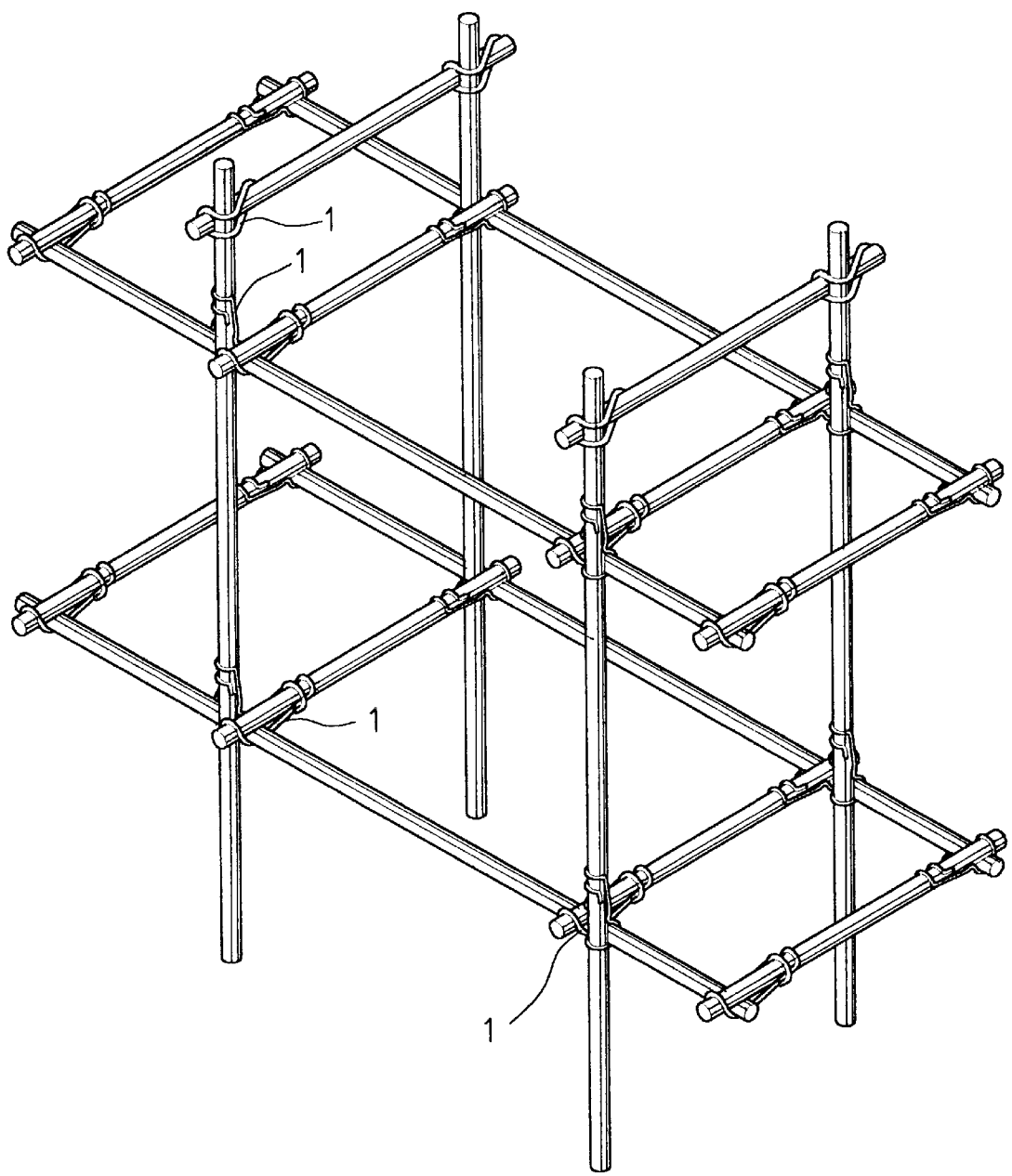
FIG. 4 is a perspective view of an assembled shelf that is assembled by means of the engaging members in accordance with the present invention.

In use, as shown in FIGS. 2 and 3, one of the rods 2 and 3 is optionally extended through the engaging member 1 and the other rod is then extended through the engaging member 1 in a cross manner. Such assembly is easy and convenient without any tool. As shown in FIG. 3, the inverted U-shaped section 11 is preferably inclined toward the retaining sections 14 and 15, while the section 11 and the receiving sections 16 and 17 are so sized that the first rod 2 rests on the second rod 3, thereby providing a reliable engaging effect between the first rod 2 and the second rod 3. FIG. 4 is an example of a shelf assembled by means of using engaging members 1 in accordance with the present invention. The overall size of the resultant assembled shelf may match with personal need or the environmental restriction.

Although the invention has been explained in relation to its preferred embodiment, it is to be understood that many other possible modifications and variations can be made without departing from the spirit and scope of the invention as hereinafter claimed.

What is claimed is:

1. An engaging member adapted to engage two cross rods consisting of a first rod and a second rod, the engaging member comprising an inverted U-shaped section having two ends, each said end extending in a direction transverse to a plane on which the inverted U-shaped section locates, thereby forming an upwardly facing receiving section adapted to receive the second rod, with the ends of said receiving section being parallel to each other and respectively joined with a first inclined section and a second inclined section, the first inclined section having a distal end extending across the second inclined section, thereby forming a first inverted U-shaped retaining section that is located above the first inclined section and the second inclined section and has a first retaining end, the second inclined section having a distal end extending across the first inclined section, thereby forming a second inverted U-shaped retaining section that is located above the first inclined section and the second inclined section and has a second retaining end, the second inverted U-shaped retaining section being spaced apart from the first inverted U-shaped retaining section, the inverted U-shaped section being adapted to receive the first rod, with the first inclined section and the second inclined section being positioned to receive the first rod therebetween, while the first inverted U-shaped retaining section and the second inverted U-shaped retaining section being adapted to engage with a portion of an upper periphery of the first rod, each of the first inclined section and the second inclined section forming a bend adjacent to an associated said receiving section adapted to securely retain the second rod in the receiving sections, the inverted U-shaped section being inclined toward the retaining sections, while the inverted U-shaped section and the sections being sized so that the first rod is adapted to rest on the second rod, thereby the engaging member is adapted to provide a reliable engaging effect between the first rod and the second rod.

\* \* \* \* \*